US011632368B2

(12) United States Patent
Paeschke et al.

(10) Patent No.: US 11,632,368 B2
(45) Date of Patent: Apr. 18, 2023

(54) METHOD AND SYSTEM FOR THE BEHAVIOUR-BASED AUTHENTICATION OF A USER

(71) Applicant: Bundesdruckerei GMBH, Berlin (DE)

(72) Inventors: Manfred Paeschke, Wandlitz (DE); Maxim Schnjakin, Berlin (DE)

(73) Assignee: Bundesdruckerei GMBH, Berlin (DE)

( * ) Notice: Subject to any disclaimer, the term of this patent is extended or adjusted under 35 U.S.C. 154(b) by 791 days.

(21) Appl. No.: 16/495,539

(22) PCT Filed: Feb. 23, 2018

(86) PCT No.: PCT/EP2018/054553
§ 371 (c)(1),
(2) Date: Sep. 19, 2019

(87) PCT Pub. No.: WO2018/172016
PCT Pub. Date: Sep. 27, 2018

(65) Prior Publication Data
US 2020/0100104 A1    Mar. 26, 2020

(30) Foreign Application Priority Data
Mar. 20, 2017   (DE) ............ 10 2017 204 626.0

(51) Int. Cl.
*H04L 9/40*        (2022.01)
*G06F 3/01*        (2006.01)
(Continued)

(52) U.S. Cl.
CPC .......... *H04L 63/0861* (2013.01); *G06F 3/017* (2013.01); *G06F 21/316* (2013.01);
(Continued)

(58) Field of Classification Search
CPC ............ H04L 63/0861; H04W 12/037; H04W 12/065; H04W 12/02; G06F 21/316
See application file for complete search history.

(56) References Cited

U.S. PATENT DOCUMENTS

| | | | |
|---|---|---|---|
| 2013/0133055 A1* | 5/2013 | Ali | ...................... H04W 12/065 726/7 |
| 2014/0289833 A1 | 9/2014 | Briceno et al. | |
| 2016/0239649 A1* | 8/2016 | Zhao | ................... H04W 12/065 |

FOREIGN PATENT DOCUMENTS

WO   WO-2015/127256 A1   8/2015

OTHER PUBLICATIONS

International Search Report PCT/ISA/210 for International Application No. PCT/EP2018/054553 dated Apr. 30, 2018.
(Continued)

*Primary Examiner* — Curtis B Odom
(74) *Attorney, Agent, or Firm* — Harness, Dickey & Pierce, P.L.C.

(57) ABSTRACT

The invention relates to a method for authenticating (400) a current user of a mobile, portable communication system (100) with respect to a server (150) by means of a behavior-based authentication.
The server (150) comprising a first interface and a second interface. The first interface is configured to communicate with at least one activatable device (152), and the second interface is configured to communicate with a mobile, portable communication system (100).
The method for authentication comprises:
receiving at least one classification result (600) by the server (150) from the mobile, portable communication system (100);
evaluating the at least one classification result (600) by the server according to a predefined examination criterion (800); and
(Continued)

activating the device (152) by the server (150) by means of a control signal.

24 Claims, 6 Drawing Sheets

(51) Int. Cl.
*G06F 21/31* (2013.01)
*H04W 12/02* (2009.01)
*H04W 12/037* (2021.01)
*H04W 12/065* (2021.01)
*H04W 12/68* (2021.01)

(52) U.S. Cl.
CPC ......... *H04W 12/02* (2013.01); *H04W 12/037* (2021.01); *H04W 12/065* (2021.01); *H04W 12/68* (2021.01)

(56) References Cited

OTHER PUBLICATIONS

Written Opinion of the International Searching Authority PCT/ISA/237 for International Application No. PCT/EP2018/054553 dated Apr. 30, 2018.
International Preliminary Report on Patentability for corresponding PCT Application No. PCT/EP2018/054553 dated Oct. 3, 2019.

\* cited by examiner

METHOD AND SYSTEM FOR THE BEHAVIOUR-BASED AUTHENTICATION OF A USER

The invention relates to a method and to a system for the behavior-based authentication of a user with respect to a server by means of a mobile, portable communication system.

Mobile, portable communication systems are firmly integrated in the everyday lives of people and have become indispensable. So as to attain access to such a system, a user typically has to authenticate himself or herself by way of a personal identification number (PIN), a password or optionally a fingerprint. In view of the multitude of devices and applications secured by PINs that users utilize on a daily basis, and the associated multitude of PINs that need to be remembered, it is quite common for a user to forget his or her PIN. Passwords, which often may be freely selected, are either too short and easy to remember; however, the drawback is that they may be guessed more quickly, and thus offer only a low degree of security. Passwords that offer a high degree of security, in contrast, are often long and complex, which makes it difficult for the user to remember them. Fingerprint sensors have the disadvantage that the user is required to specifically position a predetermined finger thereon. If the user is holding the mobile, portable communication system in the wrong hand, the fingerprint sensor is often already not able to recognize the user. Furthermore, a number of situations exist in which a fingerprint sensor does not work properly, such as when the user has dirty or moist fingers, not to mention when the user is wearing gloves.

In contrast, it is the object of the invention to enable an improved method for authenticating a user.

The object underlying the invention is achieved by the features of the independent claims. Embodiments are described in the dependent claims.

The invention provides a method and a system for the behavior-based authentication of a user, which allow authentication without a PIN or a password. The basis for the authentication is an individual intrinsic behavior of the user, which is defined by a behavior pattern or a behavioral habit of the user. The behavior-based authentication enables the user to thereby attain access to his or her mobile, portable communication system by behaving in a customary manner. The user consequently does not need to remember a password, a PIN, a specific gesture or similar means of authentication. All the underlying data is detected by the mobile, portable communication system, and all the underlying operations are executed by the mobile, portable communication system or the processor thereof. In particular, sensitive data reflecting a personal behavior of the user remains exclusively in an internal memory of the mobile, portable communication system.

According to embodiments, the method for authenticating a user of a mobile, portable communication system with respect to a server by means of behavior-based authentication comprises the following steps:
- receiving at least one classification result by the server from the mobile, portable communication system;
- evaluating the at least one classification result by the server according to a predefined examination criterion; and
- activating a device by the server by means of a control signal.

Devices including a so-called smart function often may be activated by way of mobile, portable communication systems. The mobile, portable communication system serves as a kind of key, which qualifies the user to activate smart devices. The authentication of the user with respect to the devices may take place by way of the authentication of the user with respect to the mobile, portable communication system or with respect to the device itself. During the authentication of the user with respect to the mobile, portable communication system, the mobile, portable communication system is connected to the smart device, so that an authentication of the user with respect to the mobile, portable communication system also represents an authentication with respect to the smart device, without requiring the user to explicitly authenticate himself or herself with respect to the smart device. If an authentication of the user with respect to the smart device takes place by way of the mobile, portable communication system, a password, a PIN or similar means of authentication are entered, for example, by way of the mobile, portable communication system, which allow the user to access the smart device.

Such a smart device or smart equipment may, in general, encompass, for example, without being limited thereto, a vehicle, an airplane, a machine, in particular a washing machine, a dryer, a refrigerator or similar household appliances, as well as a device of a smart home system, such as illumination, locking means, a front door, an alarm system, an air conditioning system, a heating system, audio equipment, video or television equipment, and/or a PC, which the user, for example at home, activates via the Internet, an Intranet or individual wireless links by means of the mobile, portable communication system.

According to embodiments, a device may encompass a smart device, which may furthermore be designed as a system. According to embodiments, a smart device comprises an electrical, an electronic, a mechanical or an electromechanical device and a server, wherein the server is designed to communicate with the device and a mobile, portable communication system, so that the device may be activated by the mobile, portable communication system by way of the server.

According to one embodiment, the proposed system comprises at least one device and a server, wherein the server comprises a first interface and a second interface, wherein the first interface is configured to communicate with at least one activatable device, and the second interface is designed to communicate with a mobile, portable communication system.

As a result of the communication of the mobile, portable communication system with the server, which is communicatively connected to at least one device, a server may advantageously be connected to multiple devices. The mobile, portable communication system then only has to establish a link to the server to be able to activate the at least one device by means of the server. In one embodiment, the server may, for example, be designed as a PC or a router, without being limited thereto.

According to another embodiment, a plurality of devices is provided, wherein each of the devices is equipped with a dedicated server, so that the mobile, portable communication system is connected to a respective server for each activatable device. According to such an embodiment, a server may be designed as a component of the device.

As a result of the provision of a server for each activatable device, a central server, which may be designed as a PC or a router, for example, may advantageously be dispensed with. Furthermore, a decentralized activation of devices may bring about enhanced failure protection. If it is not possible to activate a device or a server, for example, due a malfunction of the server, other devices are independent thereof and may be operated normally. Furthermore, as a result of the reduced number of links of the server to devices and the mobile, portable communication system, the requirements with regard to hardware and software of the server are lower. In this way, the server of a device is easier to maintain or replace and/or is more inexpensive to produce.

A large number of mobile, portable communication systems, such as smart phones, today are equipped with sensors to begin with, which are able to detect the position of the device in the space, whereby, for example, the display on the screen is able to rotate into the correct position relative to the spatial orientation of the device. Such a sensor is typically an acceleration sensor, a gyroscope or a combination of both. It is not only possible to detect the spatial position of the mobile, portable communication system using this sensor, but also a gross motor movement of the user, whereby the sensor may be used as a movement sensor.

A gross motor movement denotes all movement skills that a person is able to acquire with his or her extremities, trunk and head. This utilizes larger muscle groups. Gross motor skills include, for example, walking, jogging, running, hopping, riding a bicycle or driving a car. Moving the arm to carry out an activity, such as lifting a glass to drink or eating, may also be considered a gross motor movement, as may be moving an arm to pull a cellular telephone out of the pocket. In contrast, gripping a cup is considered to be a fine motor movement since the gripping movement is carried out using the fingers and utilizes smaller muscle groups. A gross motor movement may, in particular, also encompass a hip movement of the user.

Every person carries out these gross motor movements in his or her own way. As a result, a very distinct, characteristic gross motor movement profile may be assigned to a particular user of a mobile, portable communication system. The user is identifiable based on this movement profile. The data detected by the movement sensor is assigned to such a movement profile. The mobile, portable communication system is furthermore equipped with a classification module, which is trained to recognize the movement pattern of the user.

Training, in the present context, encompasses that the classification module, by evaluating training data sets, acquires the ability to recognize generic movement patterns on the one hand, and user-specific movement patterns on the other hand. Training to recognize a generic movement pattern encompasses, for example, an evaluation of multiple training data sets of a user cohort, wherein each of the training data sets is assigned to one of the users of the user cohort and includes data regarding a type of movement that is identical for all users of the user cohort. As a result of the evaluation, a generic movement pattern that is shared by all users for the identical type of movement is identified and extracted for future recognition. Training to recognize a user-specific movement pattern encompasses, for example, an evaluation of movement data of an individual user, wherein the movement data includes data regarding a particular type of movement As a result of the evaluation, a movement pattern that is user-specific for the corresponding type of movement is identified and extracted for the future recognition of user-specific movement patterns. This evaluation is carried out using a generic movement pattern for a particular type of movement, which was likewise previously trained.

A distinction is made between two types of users in the behavior-based authentication of a user. On the one hand, the user registered in the system is the user whom the system is to recognize. On the other hand, the current user is the user who presently wants to operate or use the system, which requires the user to authenticate himself or herself. If the current user is able to identified as the user registered in the system as a result of the authentication process, the current user is granted access to the system. If the current user does not agree with the user registered in the system, the system identifies the current user as a different person having no usage authorization and does not grant access. Hereafter, "the user" denotes the current user of the system. If the user registered in the system is meant, this is explicitly identified as "the registered user."

A mobile, portable communication system may encompass a single independent device or multiple devices connected mechanically and/or communicatively to one another. Such a mobile, portable communication system may, for example, comprise: a smart phone, a tablet, a personal digital assistant, a pager, smart glasses, a smart watch, a navigation device, an activity tracker, a device for recording medical data, in particular physiological data, such as a pulse meter or a blood pressure meter. The behavior-based authentication may be carried out by all mobile and portable devices and systems that are able to process data electronically and comprise at least one sensor for detecting a gross motor movement.

By way of example, a mobile, portable communication system could comprise a smart phone and a smart watch, wherein the smart phone comprises a sensor for detecting the gross motor movement of walking, and the smart watch measures the pulse and the blood pressure of the user. Based on a comparison of the data of the user and of the registered user, the user may or may not be identified as the registered user.

So as to carry out the behavior-based authentication of a user, such a mobile, portable communication system comprises at least one sensor for detecting data of a gross motor movement the user, a gross motor skill classification module, an operating system, a processor, and an internal memory. The sensor for detecting the data is designed to detect a gross motor movement of the user. The gross motor skill classification module is configured to classify the data, trained to recognize a gross motor movement of the user, implements a machine learning process, and is executed by the processor of the mobile, portable communication system, wherein the operating system is able to control the access to the mobile, portable communication system based on the success of the authentication.

The machine learning process implemented by the gross motor skill classification module denotes a process which allows the gross motor skill classification module to adapt to the user of the mobile, portable communication system. Adapting, in the present sense, denotes the adjustment and, where necessary, reconfiguration of classification parameters, based on which the user is able to be correctly identified. The machine learning process is not limited to a particular algorithm. According to embodiments, the machine learning process is an algorithm developed specifically for machine learning, for example, without being limited thereto, density-based multidimensional outlier detection ("local outlier detection"), a random forest algorithm, a neural network, a support vector machine, a Naive Bayes classifier or feedback similar to the feedback of a linear or non-linear controller.

The behavior-based authentication of a user may be divided into two operational sections. Section A comprises repeatedly carrying out the following steps:

detecting the data by the at least one sensor of the mobile, portable communication system;

entering the data in the gross motor skill classification module;

generating at least one first confidence value by the gross motor skill classification module;

storing the at least one first confidence value in the memory of the mobile, portable communication system; and training the gross motor skill classification module using the data of the user so as to train the gross motor skill classification module for a user-specific gross motor movement pattern, provided that, according to the first classification result, the user is the user registered in the mobile, portable communication system.

These steps are carried out repeatedly, whereby confidence values are continuously generated and stored in the memory of the mobile, portable communication system.

In the second section of the behavior-based authentication, the mobile, portable communication system responds to an authentication request to an application program configured for the authentication. An application may, for example, comprise an application program or an application that is implemented on the mobile, portable communication system and/or is controlled by way of the mobile, portable communication system. An application program here shall be understood to mean any type of computer program, without restriction, which includes machine-readable instructions for controlling a functionality of a computer. Such an application program may be configured, for example, to process or support a useful or desirable, non-system functionality.

In response to the authentication request, the processor of the mobile, portable communication system accesses the memory and reads out at least one first confidence value. The at least one first confidence value is then used to generate a classification result. This is checked against a particular, predefined examination criterion. If the classification result meets the examination criterion, according to one embodiment a signal is generated, wherein the signal includes the information that the authentication of the user was successful. If the classification result does not meet the examination criterion, the user is not granted access to the system.

According to one embodiment, the data is detected by the at least one sensor in the form of a data stream.

Detecting the data in the form of a stream advantageously results in a maximally sensitive distribution of the first confidence values per unit of time. Data is continuously detected and is continuously processed into first confidence values. Continuously in the present context shall be understood to mean that the data is detected as often as the clock cycle of the processor and/or of the sensor allows. As a result of the continuously available confidence values, a classification result may be generated at any time from the confidence values generated up to the minute, without the mobile, portable communication system first having to wait until a predetermined measuring interval has lapsed and current data has been processed. Furthermore, new first confidence values are continuously generated, so that current first confidence values are available in the event of an authentication request, provided the user has moved in the recent past.

In another embodiment, the mobile, portable communication system comprises an application behavior classification module. The application behavior classification module is configured to classify application data of a user and to find user-specific application patterns in the application data.

For example, the application data may comprise the following data types:

position data of the mobile, portable communication system;

application usage data of the user;

biometric data of the user;

connection data of the mobile, portable communication system; and calendar and time data.

The position data of the mobile, portable communication system is detected by a position sensor of the mobile, portable communication system, using a method for position determination. Such a method may, for example, comprise detecting a GPS signal or a triangulated position from WLAN connection data or connection data of another wireless network comprising radio cells, such as a mobile communication network.

As a result of the use of the position data for the behavior-based authentication of the user, a regular location of the user (such as at home, at work or other places he or she frequents regularly) is advantageously detected. An unauthorized user, and in particular a thief using the mobile, portable communication system, will generally not be present in places regularly frequented by the registered user. The mobile, portable communication system is thus able to recognize whether the user is the registered user. In this way, the position data may help enhance the behavior-based authentication.

The application usage data comprises an application usage behavior of the user, wherein the application usage behavior comprises pieces of information that describe which applications are started and/or executed by the user on the mobile, portable communication system, and when. It is possible to detect, for example, when and/or how often the user listens to the radio and/or what radio station he or she listens to, reads the news or operates his or her camera, using which application. In particular, applications used often in everyday life may yield a user-specific application usage profile, based on which it is possible to identify the user.

By incorporating the application usage data of the user in the behavior-based authentication method, the security of the mobile, portable communication system increases since an unauthorized user, and in particular a thief who stole the mobile, portable communication system, would also have to imitate the application usage behavior of the user to attain access to applications requiring authentication or to the mobile, portable communication system.

The biometric data may be detected by a sensor for detecting biometric data. The biometric data may, among other things, be the measurements of the face, the voice frequencies of the user, the shapes of the fingers, the shape of the auricle, the retina or iris pattern, the fingerprint of a finger, or physiological data, such as the blood pressure or the pulse of the user, in particular during specific activities such as walking.

In one embodiment, the biometric data, and in particular the measurements of the face, the iris and/or retina pattern and the shape of the auricle, may be detected when the user is using his or her mobile, portable communication system anyhow and/or is seeking to authenticate himself or herself. Depending on the executed application, at the time at which the user is using his or her mobile, portable communication system and/or is seeking to authenticate himself of herself, it may be assumed that the user is looking at the screen of the mobile, portable communication system. This is the case in the case of a chat or messaging application, for example. Since commercially available smart phones and other systems are equipped with cameras, which are also positioned on the side of the screen of the mobile, portable communication system, it is possible for a background application of the mobile, portable communication system to take a photograph of the user while he or she is using the mobile, portable communication system. This photograph may be read out, and the biometric data of the user may thus be detected. If the user seeks to access his or her system, a photograph is taken, or one or more of the most recently stored photographs are used, and the biometric data, which is calculated from the taken photograph or the stored photographs, is used for authentication.

In another embodiment, the mobile, portable communication system comprises, for example, a pressure sensor or an optical sensor for detecting a pulse beat by which the pulse and the blood pressure of the user may be determined.

As a result of the use of a biometric sensor worn directly on the body, and in particular a biometric sensor of a smart watch, such as a pressure sensor or an optical sensor, the biometric data is advantageously continuously detectable, similarly to the data, since the user wears the smart watch on his or her wrist during regular use.

In another embodiment, the mobile, portable communication system comprises a sensor for detecting a fingerprint of the user. In advantageous embodiments, the sensor is positioned in areas of the mobile, portable communication system in which the user holds the mobile, portable communication system using his or her fingertips and/or regularly touches the mobile, portable communication system to control functions.

As a result of the use of a fingerprint sensor, in particular in an area in which the fingertips of the user are located during regular use, the fingerprint, which is unique for each person and serves as an identification feature of the user, advantageously contributes to checking the authenticity of the user, and thereby enhances the security of the method.

As a result of the use of the biometric data of the user for the behavior-based authentication of the user, the data that is used for authentication is advantageously highly personally dependent on the user. In particular, biometric data offers a high level of protection against forgery, whereby the security of the authentication is enhanced.

The connection data of the mobile, portable communication system to other devices capable of communicating, such as computers, household appliances capable of communicating, or individual, mobile, portable communication devices and systems, may be used to demonstrate a typical behavior pattern of the user. It is possible, for example, to connect individual devices by WLAN, Bluetooth, radio frequency identification (RFID), near field communication (NFC) or a cable to the mobile, portable communication system. In this way, a connection profile may be created for the user, which includes pieces of information about the regular connections of the mobile, portable information system to other devices.

For example, a user may connect the mobile, portable communication system to the private WLAN of an apartment or a public WLAN. In another embodiment, the user connects the mobile, portable communication system to household appliances and/or a computer via the Internet or an Intranet, resulting in a user-specific connection profile. This usage profile may, for example, encompass, without being limited thereto, a washing machine, a dryer, a refrigerator or similar household appliances, as well as devices of a smart home system, such as illumination, an alarm system, an air conditioning system, a heating system, audio equipment, video or television equipment, and/or a PC, which the user activates at home via the Internet, an Intranet or individual wireless links.

As a result of the use of the connection data of the user for the behavior-based authentication of the user, an unauthorized user advantageously has to know the devices and, where necessary, have access to the devices to which the registered user normally connects the mobile, portable communication device.

As a result of the use of the connection data for the behavior-based authentication of a user, the current user, who wears a smart watch, for example, may advantageously authenticate himself or herself by wearing the smart watch. In this way, the smart watch functions in the manner of a key, which enables access to the system.

A thief who stole the mobile, portable communication system thus would also have to take possession of the smart watch to attain access to the system.

Calendar and/or time data may be detected by a clock implemented in the mobile, portable communication system or by an external clock, the signal of which is received by a sensor, and in particular a wireless signal which is received by a wireless sensor, of the mobile, portable communication system.

In another embodiment, the connection data of the mobile, portable communication system is correlated with other devices and/or the position data of the mobile, portable communication system is correlated with the calendar and/or time data.

As a result of the use of the calendar and/or time data for the behavior-based authentication of the user, a time-specific application behavior of the user may advantageously be created, in particular through the communication with the aforementioned applications. It is possible to recognize, for example, that the user is on his or her way to work from Monday through Friday and listens to a particular radio station, and on the weekend goes for a walk and plays selected music via a music application, or that the user reads the news every evening at a specific time, such as 8:00 pm, by way of his or her mobile, portable communication system. The use of the calendar and/or time data thus results in enhanced security of the mobile, portable communication system by contributing to a structured application usage profile of the user in terms of time, which is more difficult to imitate compared to a unstructured application usage profile in terms of time.

In another embodiment, the distance between two or more communication devices of a mobile, portable communication system is ascertained based on the signal strength of the signal of the wireless connection between the devices. Such a wireless connection signal may be a Bluetooth signal, a WLAN signal or a radio signal, for example. According to this embodiment, the distance between the devices ascertained from the wireless connection signal may be detected as part of the application data and used for the behavior-based authentication of the user.

The detection of the distances between two devices of a mobile, portable communication system as part of the application data and the use of the distance for the behavior-based authentication of the user allow the security of the method for the behavior-based authentication to be enhanced, since another parameter would have to be forged or imitated by an unauthorized user to attain access to the system.

According to embodiments, the distance is used to recognize a gross motor movement pattern of the user.

The following steps are carried out so as to use the application data for the behavior-based authentication of the user:

- detecting the application data;
- entering the application into the application behavior classification module;
- generating at least one second confidence value by the application behavior classification module;
- storing the at least one second confidence value in the memory of the mobile, portable communication system; and
- training the application behavior classification module using the application data of the user so as to train the application behavior classification module for a user-specific application behavior pattern, provided that, according to the classification result, the user is the user registered in the system.

Not only the at least one first confidence value, which is based on the data of the sensor for detecting gross motor movement, but also the at least one second confidence value, which results from the application data of the user, is used during the generation of the classification result.

In another embodiment, the mobile, portable communication system comprises a fine motor skill classification module, which is designed to detect a fine motor movement of the user, and a sensor for detecting a fine motor movement in the form of fine motor data.

A fine motor movement is a movement of fine muscle groups, such as the muscles of the fingers. Fine motor skills denote a deliberate and coordinated movement, for example of the hand and/or finger muscles, but also of the muscles of the mouth, the eyes and the face. The fine motor movement detected by a fine motor sensor of the mobile, portable communication system may, for example, encompass a particular movement of the fingers.

In embodiments, the sensor for detecting a fine motor movement detects the input speed, the input cycle and/or the input accuracy of the user while carrying out an input into the mobile, portable communication system. Such an input may, for example, be, without being limited thereto, the typing of words or swiping of words, that is, an input method analogous to typing during which the finger maintains, or the fingers maintain, contact with the screen surface during the selection of letters, on a virtual keyboard, the tracing of geometric figures shown on the screen, or another movement by which the user carries out an input. Furthermore, fine motor movements may encompass changes in the orientation, such as the angle of inclination, of the mobile, portable communication system during usage.

A sensor for detecting a fine motor movement may, for example, be designed as an optical system or as a touch pad or touch screen, in particular, however, without being limited thereto, a resistive touch screen, a surface capacitive touch screen, a projected capacitive touch screen, or an inductive touch screen.

The following steps are carried out so as to use the fine motor data for the fine motor authentication of the user:

- detecting the fine motor data;
- entering the fine motor data into the fine motor skill classification module;
- generating at least one third confidence value by the fine motor skill classification module;
- storing the at least one third confidence value in the memory of the mobile, portable communication system; and
- training the fine motor skill classification module using the fine motor data of the current user so as to train the fine motor skill classification module for a user-specific fine motor movement pattern, provided that, according to the classification result, the current user is the user registered in the system.

Not only the at least one first confidence value, which is based on the data of the sensor for detecting the gross motor movement, but also the at least one third confidence value, which results from the fine motor data of the user, is used when checking the classification result against the examination criterion.

The use of a fine motor movement of a user enhances the security of the behavior-based authentication since additional parameters are required to authenticate the user.

In another embodiment, the user is prompted, after a failed authentication attempt, to carry out an input into the mobile, portable communication system so as to be able to detect a fine motor movement of the user. The input may, for example, encompass the tracing of a particular figure on the screen or the input of a predefined word or the input of multiple words. The words and/or patterns may be predefined or be randomly selected by the system or the user. For example, the corresponding words and/or patterns are displayed on the screen.

The authentication by means of a fine motor movement in the event of a failed authentication advantageously yields the option for the user to authenticate himself or herself despite a failed authentication, without having to resort to a PIN or a password.

Due to the similarity of the processing structure of the different data, the following comments apply equally to the gross motor data, the fine motor data and the application data, the gross motor skill classification module, the application behavior classification module and the fine motor skill classification module, and the at least one first, second and third confidence values. Furthermore, hereafter "data" denotes the data of the sensor for detecting a gross motor movement, the application data and/or the data of the sensor for detecting a fine motor movement. If only the data of the sensor for detecting a gross motor movement, the application data or the data of a fine motor movement is meant, this is explicitly indicated.

Furthermore, according to another embodiment, the gross motor skill classification module and/or the application behavior classification module and/or the fine motor skill classification module are designed as a classification module that is able to process the data. For example, according to another embodiment, the gross motor skill classification module and/or the application behavior classification module and/or the fine motor skill classification module are encompassed by one and the same or different application programs, which are configured to carry out a behavior-based authentication.

According to embodiments, the classification module or modules, that is, the gross motor skill classification module and/or the application behavior classification module and/or the fine motor skill classification module, generate a shared classification result, using confidence values that were each ascertained by the classification module or modules for classification module-specific data.

In another embodiment, a signal comprising the information of the failed authentication is transmitted if the classification result was not checked successfully against the examination criterion. According to one embodiment, such a signal may be limited to the information of the failed authentication. According to further embodiments, the signal may comprise the information regarding the reason for the failure of the authentication. According to further embodiments, such a reason may, for example, include the age of the current classification result, the classification result itself or a different reason for the failure. In one embodiment, an examination criterion may include that the classification result is not older than a few minutes, a few hours, a day or a week. In another embodiment, the examination criterion may include that the classification result has to reach a particular threshold value.

As a result of the transmission of a signal in the event of a failed authentication, the user is advantageously informed that his or her authentication has failed and may deliberately behave so as to attain access to the system. For example, the signal indicates that the gait of the user was not recognized. The user notices the signal and begins to walk back and forth until the examination criterion is met. Such a signal may be displayed to the user, for example, by means of a display of the mobile, portable communication system, communicated acoustically via a speaker of the mobile, portable communication system or signaled by means of a vibration pattern, generated by a vibration mechanism of the mobile, portable communication system.

In another embodiment, at least one pattern in the form of a pattern function and at least one comparison data set are stored in the memory of the mobile, portable communication system, wherein the comparison data set includes values for at least one comparison parameter, the following steps being carried out by the respective classification module:
   a) comparing the detected data to the at least one pattern function;
   b) assigning the data to a respective pattern corresponding to the pattern function, and receiving at least one classification parameter corresponding to the pattern by the classification module if it is possible to assign the data to the at least one pattern; and
   c) generating a confidence value for each classification parameter by comparing the at least one classification parameter to the respective comparison parameter of the comparison data set.

In another embodiment, the comparison parameters are re-calculated and stored in the memory of the mobile, portable communication system when the comparison data set changes.

Generating the classification result from the at least one confidence value of the at least one classification parameter advantageously results in a method which is repeatable for the user using fixedly defined steps, but is very difficult for an unauthorized user to circumvent. An attacker attempting, by means of an electronic attack, to access the system by the attacker attempting to guess the data and application data of the at least one sensor, the at least one classification parameter and the at least one confidence value so as to feign a falsified classification result to the system would have to be familiar with the at least one pattern function, or know which classification parameters are processed into confidence values and what values these have to have for access to the system to be granted.

In one embodiment, the data is stored in the memory of the mobile, portable communication system when the classification result resulting from the data has successfully contributed to the authentication of the user. The data is stored by adding the data to the corresponding comparison data sets. The comparison parameters are calculated again from the now modified comparison data set so as to be able to carry out a next authentication of the user using current comparison parameters.

Storing the data in the memory of the mobile, portable communication system and adding the data to the corresponding comparison data set in the event of a successful authentication of the user advantageously results in fed-back training of the classification modules. The comparison data sets, and thus the comparison parameters, adapt to the behavior of the user, whereby the method becomes resistant to minor behavioral changes or adapts thereto. Such a behavioral change may, for example, be caused by an injury of the user which influences the gait or the writing behavior. The permanent switch to a different radio station by means of a radio application represents another example of a behavioral change. For example, if the user no longer likes the broadcast program of the station he or she previously listed to, he or she will look for a new one. With such and similar behavioral changes, the user will continue to be able to successfully authenticate himself or herself based on the storage of the data in the memory of the mobile, portable communication system and the addition of the measuring data to the corresponding comparison data set.

In another embodiment, the data forming part of the respective comparison data set is deleted from the memory of the mobile, portable communication system when the data is older than an established time. The established time may, for example, be days, weeks, months or years. If the comparison data set is deleted completely as a result of the deletion of the data, according to another embodiment a signal is generated, which signals to the user that an authentication by way of the deleted comparison data set is no longer possible until corresponding comparison data is available again, that is, a new comparison data set has been generated. Comparison data for such a new comparison data set may be detected, for example, by the user authenticating himself or herself in a non-behavior-based manner, for example by way of a PIN or an analogous method, and beforehand or subsequently behaves in such a way that new data is detected and stored in the memory of the mobile, portable communication system, whereby the detected data forms a new comparison data set.

As a result of the deletion of the data when an established age of the data has been reached, the comparison data set, and thus the comparison parameters, may advantageously change along with behavioral changes of the user. Since the behavior of the user may change, in particular over an extended time period of one year or more, for example, it is advantageous for the method when the comparison parameters change along with the behavior of the user, that is, possibly outdated data that is no longer able to correctly reflect the current behavior of the user is deleted as a precautionary measure. As a result of the deletion of data of a particular age, the behavior of the user in the past, which does not necessarily have to agree with the behavior of the user at present, does not have any influence on the behavior-based authentication of the user. The age of data is calculated, for example, starting from the point in time at which the data is detected and/or stored.

In another embodiment, the user has to authenticate himself or herself after an initial operation.

An authentication after an initial operation may, for example, include an input of a one-time password or an initialization PIN, which is made available to an authorized user as part of the lawful acquisition of the system, for example. According to further embodiments, the authentication after an initial operation may, for example, also include entering or transmitting an initial authentication token into or to the system. For example, the initial authentication token may be provided by a central authentication service with respect to which the user has authenticated himself or herself as an authorized user.

As a result of the authentication after the initial operation, only the authorized user may thus advantageously use the still untrained system. In the case of an initial operation, an automatic personalization of the mobile, portable communication system for the authorized user takes place, for example, after and/or together with the aforementioned authentication of the authorized user, if this authentication is successful. In the course of the authentication and/or thereafter, data is detected for a behavior-based authentication of the authorized user and added to the comparison data set. The classification module is thus trained for the corresponding user, that is, the mobile, portable communication system is personalized. If the aforementioned authentication of the authorized user fails, no data is detected, for example, or detected data is not added to the comparison data set.

In a further embodiment, the user has to personalize the mobile, portable communication system after the initial operation. When the mobile, portable communication system is used for the first time for the behavior-based authentication, the mobile, portable communication system transmits a signal to the user. The signal includes the prompt to personalize the mobile, portable communication device by the user by a deliberate or predefined behavior, which generates at least one comparison data set. For example, the user is asked to run or to walk with the mobile, portable communication device.

As a result of the personalization of the mobile, portable communication system after the initial operation based on a corresponding signal, the user is advantageously able to employ the method for behavior-based authentication as early as possible. The personalization after the initial operation includes detecting data so as to create the corresponding comparison data set therefrom.

In another embodiment, the confidence values of the classification parameters are stored in the memory of the mobile, portable communication system. The sum of the confidence values of the classification parameters forms the classification result.

As a result of storing the confidence values as a classification result, the confidence values may advantageously be used individually for checking. In another embodiment, fewer confidence values are read out from the memory and checked for authentication requests having a low examination criterion than in the case of an authentication request having a higher examination criterion. A low examination criterion may exist, for example, when the user is looking to change the radio station. A high examination criterion may exist, for example, when the user is looking to open a front door. In another embodiment, the examination criterion includes a different threshold value for each confidence value, so that the quality of the individual classification parameters from which the confidence values are calculated is taken into consideration when checking the classification result against the examination criterion.

In another embodiment, the examination criterion includes that the at least one confidence value has to reach a particular threshold value to achieve a successful authentication of the user.

As a result of the examination criterion being that a confidence value has to reach a minimum level, the classification result may advantageously be checked against the examination result by comparing only one value. This step thus requires very few operations, whereby the system has to carry out fewer arithmetic operations. This results in reduced energy consumption for the system. Such an embodiment is advantageous, in particular, for mobile, portable communication systems operated by a battery.

In another embodiment, the examination criterion includes that multiple stored confidence values must each reach an individual threshold value.

As a result of the examination criterion including a respective individual threshold value for multiple confidence values, the examination criterion may be individually adapted to the respective accuracies of the individual confidence values. This results in increased accuracy of the overall behavior-based authentication.

According to another embodiment, the at least one second confidence value, which is based on the application data, is only used during the generation of the classification result when, in a preceding step, the gross motor skill classification module has recognized a gross motor movement of the user in the data. In this way, for example, application usage data of a radio is only detected when the user is in the process of walking. In another embodiment, it is possible to recognize that the mobile, portable communication system being pulled out of the pocket, whereupon, for example, an execution of a news application is used as part of the application usage profile.

As a result of the use of the at least one second confidence value, which is based on the application data, in combination with the recognized gross motor movement of the user, the classification of the first classification module, which uses the gross motor movement data, may advantageously become significantly more precise, since the at least one confidence value, based on the application data, may be used to refine the classification result based on the at least one confidence value of the gross motor movement data.

In another embodiment, the confidence values that ultimately result from the gross and/or fine motor data and/or the application data may be combined into a resulting confidence value. The combining may, for example, but does not necessarily have to, include finding a mean value, a median or a mode. Forming the resulting confidence value makes it possible to indicate the probability with which the current user is the user registered in the mobile, portable communication system.

As a result of the formation of a resulting confidence value and the use of the resulting confidence value for the behavior-based authentication of the user, only a single numerical value is advantageously necessary to authenticate the user. No details regarding the application usage or personal information of the user is transmitted to the system in need of the authentication so as to authenticate the user. This protects, in particular, data security or the anonymity of the user since it is no longer traceable from the resulting confidence value which confidence values or classification parameters the confidence value is composed of in detail, and what values each of these had.

In another embodiment, the individual confidence values of the classification parameters are weighted during the evaluation, using a respective weighting factor. The weighting factors are assigned to the respective confidence value.

As a result of the use of weighting factors for the respective confidence values in the calculation of the resulting confidence value, the accuracy of the resulting confidence may advantageously be increased during a check against an examination criterion. The individual confidence values resulting from different classification parameters may be weighted as a function of the importance and/or accuracy of the determinability thereof. Since each user behaves differently, the individual classification parameters also play roles of varying importance in the behavior-based authentication of the user. For example, a first user of a first mobile, portable communication system could regularly a radio application of his or her mobile, portable communication system, while a second user of a second mobile, portable communication system never uses a radio application. As a result of the option of weighting the individual confidence values, the confidence value for the usage of a radio application may be assigned a higher weighting factor for the first user than the second user.

In another embodiment, the weighting factors of the confidence values are predefined by the examination criterion.

Predefining the weighting factors by the examination criterion advantageously allows different confidence values to be individually weighted as a function of the degree of security of the examination criterion. For example, in the case of examination criteria that require a very high authentication probability, all parameters may be incorporated, whereby all confidence values are read out to yield a resulting confidence value. In contrast, in the case of an examination criterion requiring a low security level, only a few confidence values or classification parameters are, or a single confidence value or classification parameter is, used for the evaluation.

In another embodiment, the individual weighting factors of the respective confidence values are fixedly predefined. Fixedly predefined in the present connection shall be understood to mean that the weighting factors are established from the outset during an initial operation of the system, and no changes in the weighting factors are provided for during the intended operation of the mobile, portable communication system.

Predefining the weighting factors for the confidence value advantageously results in reduced computing complexity, which results in low battery consumption, in particular for mobile, portable communication systems. The mobile, portable communication system does not have to check which weighting factors are to be established for which confidence value, but ultimately only has to read out the corresponding confidence values, which are already calculated using the weighting factors, from the memory.

In another embodiment, the user personally establishes the weighting factors of the individual confidence values in an initiation process. The established weighting factors are then stored in a configuration file in the memory of the mobile, portable communication system.

As a result of the establishment of the weighting factors by the registered user himself or herself, the registered user may advantageously personally determine to what extent his or her applications or behavior patterns contribute to the behavior-based authentication. This increases the freedom of the registered user during the configuration of the system since the registered user is able to personally decide which classification parameters are covered by his or her behavior pattern. For example, the registered user may establish that the use of the radio application is not to be considered, or is to be considered only to a very small degree, in the generation of the classification result, since he or she typically only uses the radio application on an irregular basis. In contrast, the same user could incorporate the confidence values of the position determination to a greater degree in the generation of the classification result since he or she has a very structured daily routine and is present in certain places with high regularity.

In another embodiment, the examination criterion is established by the executed application requesting the authentication of the user.

As a result of an establishment of the examination criterion by the executed application, the security of the authentication may advantageously be determined by the system by means of the examination criterion. In this way, for example, systems that disclose sensitive areas or pieces of information, such as an apartment door protecting the private residence of the user, may require a considerably higher security level of the user than a stereo system.

In another embodiment, multiple users are registered on the mobile, portable communication system, and the classification result is generated for each registered user. A user recognition module then decides which user is presently active, wherein the user recognition module is likewise carried out by the processor of the mobile, portable communication system.

In another embodiment, the identification of the user is provided by the user recognition module by means of a decision tree.

As a result of the option to identify multiple users, work devices or work systems are advantageously made available by an employer to a multitude of employees, for example, wherein the multitude of employees who alternately use the respective mobile, portable communication system may employ the method for the behavior-based authentication.

In another embodiment, the user recognition module is configured so as to recognize a change of the user based on gross and/or fine motor data. The user recognition module generates a second classification result, which indicates which of the registered users is presently the current user. The second classification result is then formed when the user recognition module recognizes a movement that is typical of a change in user of a mobile, portable communication system. A typical movement may encompass taking off, and putting back on, a smart watch, handing over a cellular telephone, or a comparable movement.

The user recognition module is configured to identify a change in user based on a gross and/or fine motor movement. For this purpose, the user recognition module is configured to recognize a gross and/or fine motor movement of taking off and/or putting on the mobile, portable communication system. Furthermore, the user recognition module is trained to recognize user-specific movement patterns in the data and/or the fine motor data, wherein the user recognition module repeatedly carries out the following steps:

entering the data and/or fine motor data into the user recognition module;
generating a second classification result by the user recognition module as to whether a change in user is taking place or the mobile, portable communication system has been taken off or put on; and
storing the second classification result in the memory of the mobile, portable communication system.

Thereafter, the user recognition module accesses the memory of the mobile, portable communication system so as to read out at least one of the stored second classification results from the memory. The at least one fourth classification result is evaluated to check whether a change in user has taken place. The existing first, second and/or third classification results are discarded in the event of a change in user to ensure that, in the event of a change in user, a non-authenticated user uses the mobile, portable communication system. This non-authenticated user then has to re-authenticate himself or herself.

In one embodiment, the machine learning method implemented by the gross motor skill classification module is a random forest algorithm, which classifies a movement as a movement known to the gross motor skill classification module.

In another embodiment, the user recognition module is configured so as to recognize an at least temporary termination of the use of the mobile, portable communication system by the current user based on gross and/or fine motor data. For this purpose, the user recognition module is configured to recognize a gross and/or fine motor movement of taking off the mobile, portable communication system. If such a termination is recognized, the existing confidence values are discarded, for example, to ensure that a non-authenticated user uses$_{[JM1]}$ the mobile, portable communication system in the event of a possible change in user. This non-authenticated user then has to re-authenticate himself or herself.

As a result of the implementation of the machine learning method in the form of a random forest algorithm, the parameters for classifying the gross motor movement advantageously contribute particularly efficiently to the classification, and furthermore, the random forest algorithm is particularly easy to implement based on the established number of available parameters.

In another embodiment, the server and the mobile, portable communication system communicate via a cryptographically secured and/or encrypted wireless link. The wireless link may, for example, be designed as a link via Bluetooth, a wireless local network (WLAN), radio frequency identification (RFID) or near filed communication (NFC). The cryptographic securing may include the exchange of certificates, a challenge response method or other suitable methods for cryptographic securing. The encryption may encompass symmetric or asymmetric encryption.

As a result of the connection of the mobile, portable communication system via a cryptographically secured and/or encrypted wireless link, the user may advantageously connect his or her mobile, portable communication system to the server in a simple manner. A fixed cable connection is not required, and the user is able to establish a link to the server from any arbitrary point as long as he or she is located within a range of the wireless link or a network, such as a virtual network, with the server.

In another embodiment, the server and the device are connected to one another via a network.

As a result of the use of a network for connecting the server to a device, the server may advantageously be detached from the network and repaired, independently of the device, if the server is defective and has to be repaired. This is particularly advantageous for large devices, such as washing machines, vehicles or airplanes or a front door, since devices of this size may be cumbersome and/or cost-intensive to maintain.

Furthermore, as a result of the use of a network, the server may be easily replaced with a newer server, possibly having more recent security standards, without directly having to use a new device. Since, in particular in information technology, standards may fundamentally change and/or improve during time periods of several months to a few years, the ability to replace the server is particularly advantageous, in particular for devices that are typically used over several years or even decades, such as a vehicle or large machines, front doors or the like, since the user only has to replace the server to meet the current security standard.

Embodiments will be described in more detail hereafter with reference to the drawings. In the drawings.

Elements of the following embodiments that correspond to each other are denoted by the same reference numerals.

Figure 1:
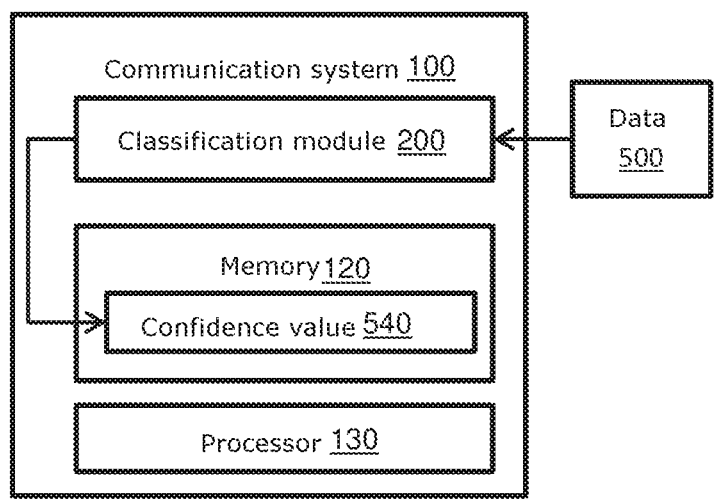
FIG. 1 shows a schematic design of an exemplary mobile, portable communication system for the behavior-based authentication of a user.

FIG. 1 shows the schematic design of an embodiment of a mobile, portable communication system 100 carried by a user. In various embodiments, the mobile, portable communication system 100 may comprise a single mobile, portable communication device or multiple mobile, portable communication devices. The mobile, portable communication system is suitable for carrying out a behavior-based authentication of the user 1. The mobile, portable communication system 100 comprises a sensor that is suitable for detecting a gross motor movement of the user in the form of data 500. Furthermore, the mobile, portable communication system 100 comprises a classification module 200, which is designed as a gross motor skill classification module suitable for processing the data 500 of a sensor. The mobile, portable communication system 100 moreover comprises a memory 120, in which the data 500 may be stored in processed form as a confidence value 540. The mobile, portable communication system 100 furthermore comprises a processor 130, which executes the classification module 200.

In another embodiment, the mobile, portable communication system 100 implements an application designed to detect application data as data 500. The mobile, portable communication system 100 comprises a further classification module 200, which is designed as an application behavior classification module. The application behavior classification module is designed to process the application data of an application.

In another embodiment, the mobile, portable communication system 100 comprises a sensor designed to detect a fine motor movement of the user as data 500. The mobile, portable communication system 100 comprises a further classification module 200, which is designed as a fine motor skill classification module. The fine motor skill classification module is designed to process the fine motor movement data of the user.

If the user carries out a gross motor movement and carries the mobile communication system 100 in the process, the sensor may detect this movement in the form of data 500. For example, the sensor may be designed as an acceleration sensor or a gyroscope or a combination of both. The movement of the user may be, for example, walking, jogging, running or a movement of the arm, if the portion of the mobile, portable communication system 100 comprising the sensor is attached on the arm.

A gross motor movement may be understood to mean, for example, movement sequences such as walking, jogging, running, hopping, climbing, balancing, riding a bicycle, driving a car or a movement of the arm, such as when drinking, when looking at a watch, or when pulling the mobile, portable communication system 100 out of a pocket.

If the user uses an application that is implemented on his or her mobile, portable communication system 100, the mobile, portable communication system 100 detects the application data as data 500.

If the user carries out a fine motor movement, the sensor may detect this movement in the form of data 500. For example, the sensor may be designed as a touch display, a keyboard or a combination of both. The fine motor movement of the user may be detected in the form of a typing speed, an input frequency or an input accuracy, for example.

The classification module 200 receives the data 500 and classifies the data 500 as a pattern. The classification module 200 is executed by a processor 130 of the mobile, portable communication system 100 in the process. From the classification, the gross motor skill classification module 200 generates the at least one confidence value 540. This at least one confidence value 540 is stored in the memory 120 of the mobile, portable communication system 100.

If the user has to authenticate himself or herself, the at least one confidence value 540 is read out from the memory 120 and processed. The classification result 600 is generated in the process.

If the user has been authenticated according to the classification result 600, the data 500 which contributed to the successful authentication is stored in the memory 120 of the mobile, portable communication system 100, or is added to a comparison data set stored in the memory 120, so as to be used for future authentication attempts during the generation of the future confidence values 540.

Figure 2:
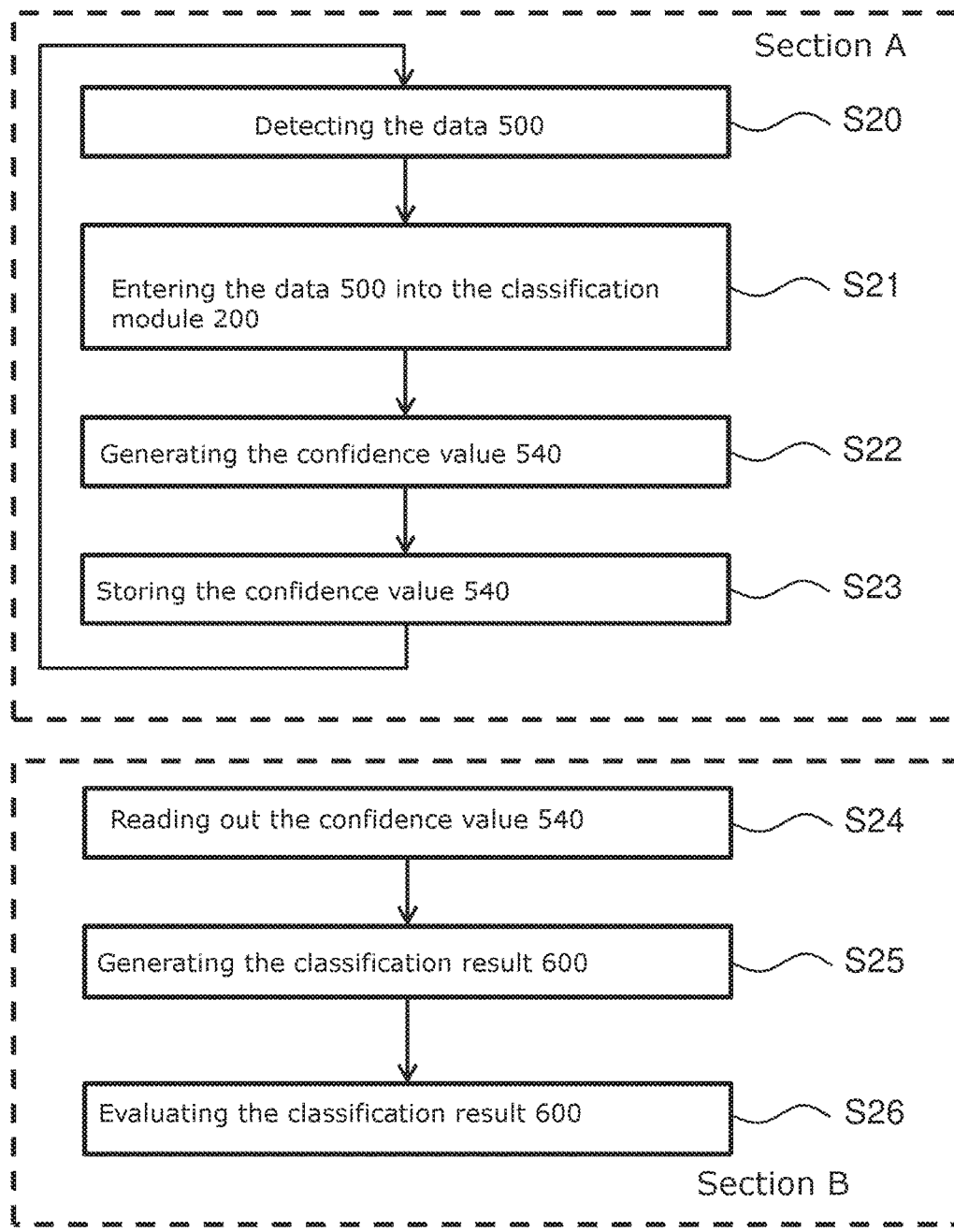
FIG. 2 shows a schematic flow of a behavior-based authentication in a flow chart.

FIG. 2 shows the behavior-based authentication of a user in a flow chart. The behavior-based authentication may be divided into two sections A and B: Section A is carried out repeatedly, thus forming a look-like implementation structure. In step S20, the mobile, portable communication system 100 detects the data 500. In step S21, the data 500 is entered into the classification module 200. In step S22, the classification module 200 generates the at least one confidence value 540 from the data 500. In step S23, the at least one generated confidence value 540 is stored in the memory 120 of the mobile, portable classification system$_{[IM2]}$ 100. The mobile, portable communication system 100 then detects new data 500. The entire method according to Section A is carried out repeatedly.

In one embodiment, the mobile, portable communication system 100 detects the data 500 in the form of a data stream, wherein the classification module 200 receives the data 500 in the form of a stream and processes it. The confidence values 540 are stored in the memory 120 of the mobile, portable communication system 100 at very short temporal intervals, which are predefined by the clock rate of the processor and/or the sensor.

Section B is carried out when the user has to authenticate himself or herself, and an authentication request was transmitted to the operating system. The authentication request includes a prompt to read out at least one confidence value 540 from the memory 120. The at least one confidence value 540 is then read out from the memory 120 in step S24.

In step S25, the classification result 600 is generated from the at least one confidence value 540. Thereafter, the classification result 600 is evaluated in step S26. An evaluation of the classification result 600 includes, for example, checking the classification result 600 against an examination criterion. If the classification result 600 meets the examination criterion 800, according to one embodiment an authentication signal is generated. If the classification result 600 does not meet the examination criterion 800, no authentication signal is generated.

If the user has been authenticated according to the classification result 600, whereby a transmission of an authentication signal was prompted, the data 500 which contributed to the successful authentication is stored in the memory 120 of the mobile, portable communication system, or is added to a comparison data set, so as to be used for future authentication attempts during the generation of the future classification results 600.

Figure 3A:
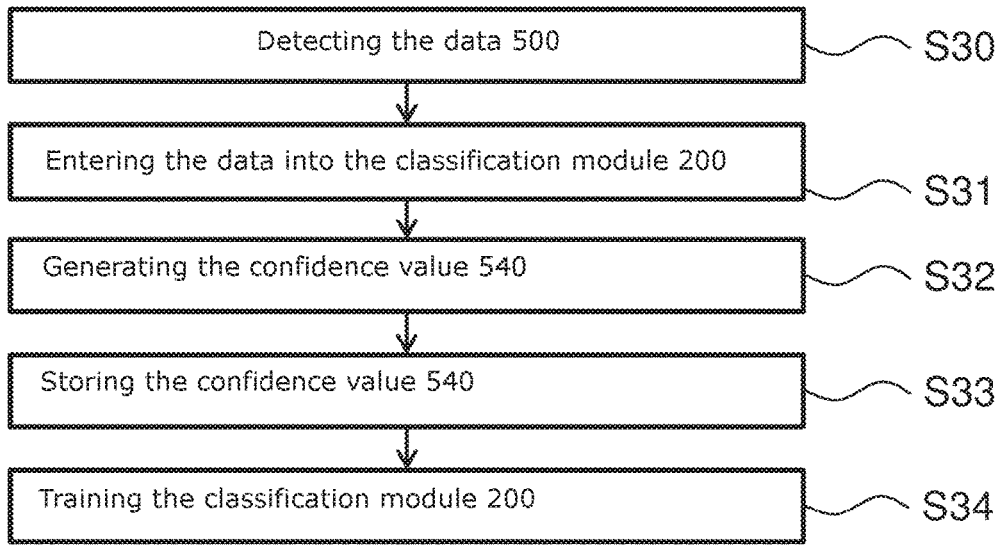
FIG. 3a shows steps of the behavior-based authentication in a flow chart.

FIG. 3a shows a flow chart representing the method loop A according to FIG. 2. In step S30, the data 500 is detected. In step S31, the detected data 500 is entered into the classification module 200. The gross motor movement data is entered into the gross motor skill classification module. The fine motor movement data is entered into the fine motor skill classification module. The application data is entered into the application behavior classification module.

In step S32, the classification module 200 generates at least one confidence value 540. For example, a confidence value 540 is generated which includes the evaluation of the gross motor movement data, the fine motor movement data and/or the application data. In step S33, the at least one generated confidence value 540 is stored in the memory 120 of the mobile, portable communication system 100. Finally, in step S34, the classification module 200 is trained, wherein the training depends on the classification result 600 (see FIG. 2).

Figure 3B:
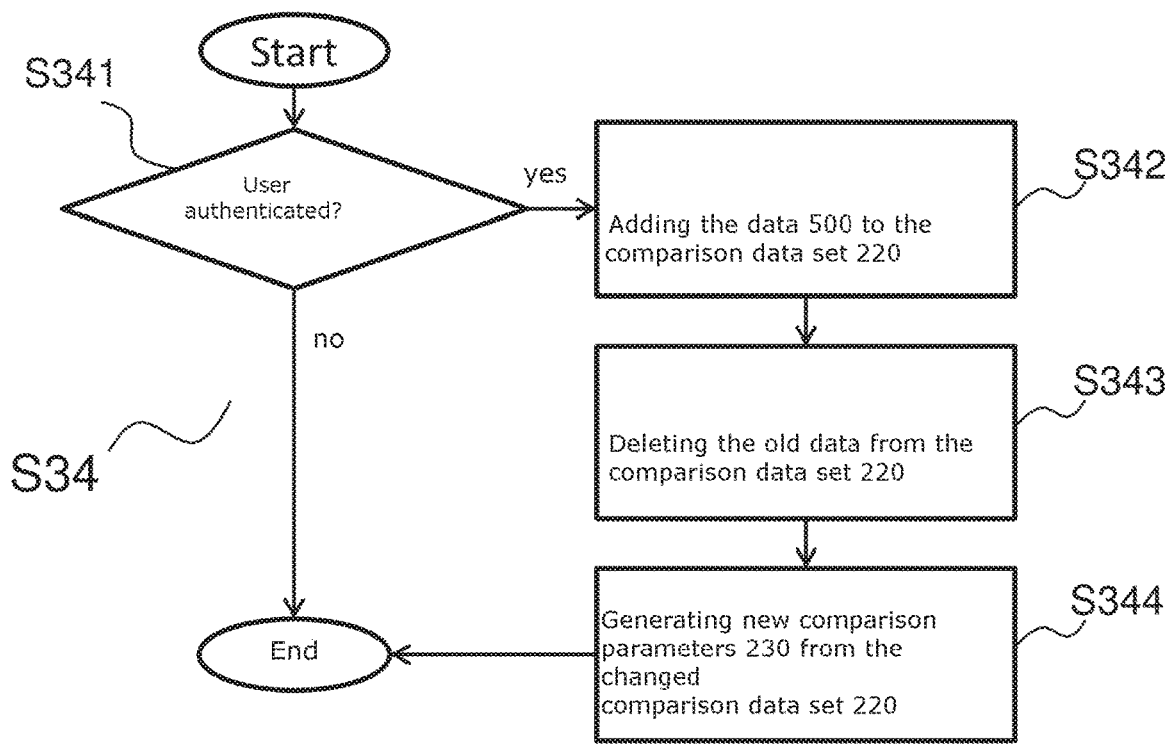
FIG. 3b shows steps of training a classification module in a flow chart.

FIG. 3b shows the training according to step S34 of FIG. 3a in detail. Initially, it is checked whether the user was able to authenticate himself or herself by way of the classification result 600. If this is not the case, the detected data 500 is discarded, and no training takes place.

If the authentication of the user was successful, the data 500 is added to a corresponding comparison data set 220, and thus stored in the memory 120 of the mobile, portable communication system. For example, the memory 120 comprises separate comparison data sets 200 for the gross motor movement data, the fine motor movement data and/or the application data. For example, the memory 120 comprises a comparison data set for the data 500.

In one embodiment, it is now checked whether the comparison data set or comparison data sets 220 comprises or comprise data 500 older than a particular threshold age. The threshold age is established, for example, by the user, the system 150 or the mobile, portable communication system 100. For example, this threshold age may be days, weeks, months or years. For example, it is four weeks, three months, or one year.

If the comparison data sets 220 have changed as a result of the addition of new data 500 and/or the deletion of old data 500, the respective comparison parameters 230 are re-determined. These new comparison parameters 230 are stored, for example, in the memory 120 of the mobile, portable communication system 100 and are available to the classification module 200 during the next authentication attempt. As an alternative, the comparison parameters 230 are recalculated during every authentication attempt, so that it is possible to ensure that up-to-date comparison parameters 230 trained for the authorized or registered user are used at all times for the authentication.

Figure 4:
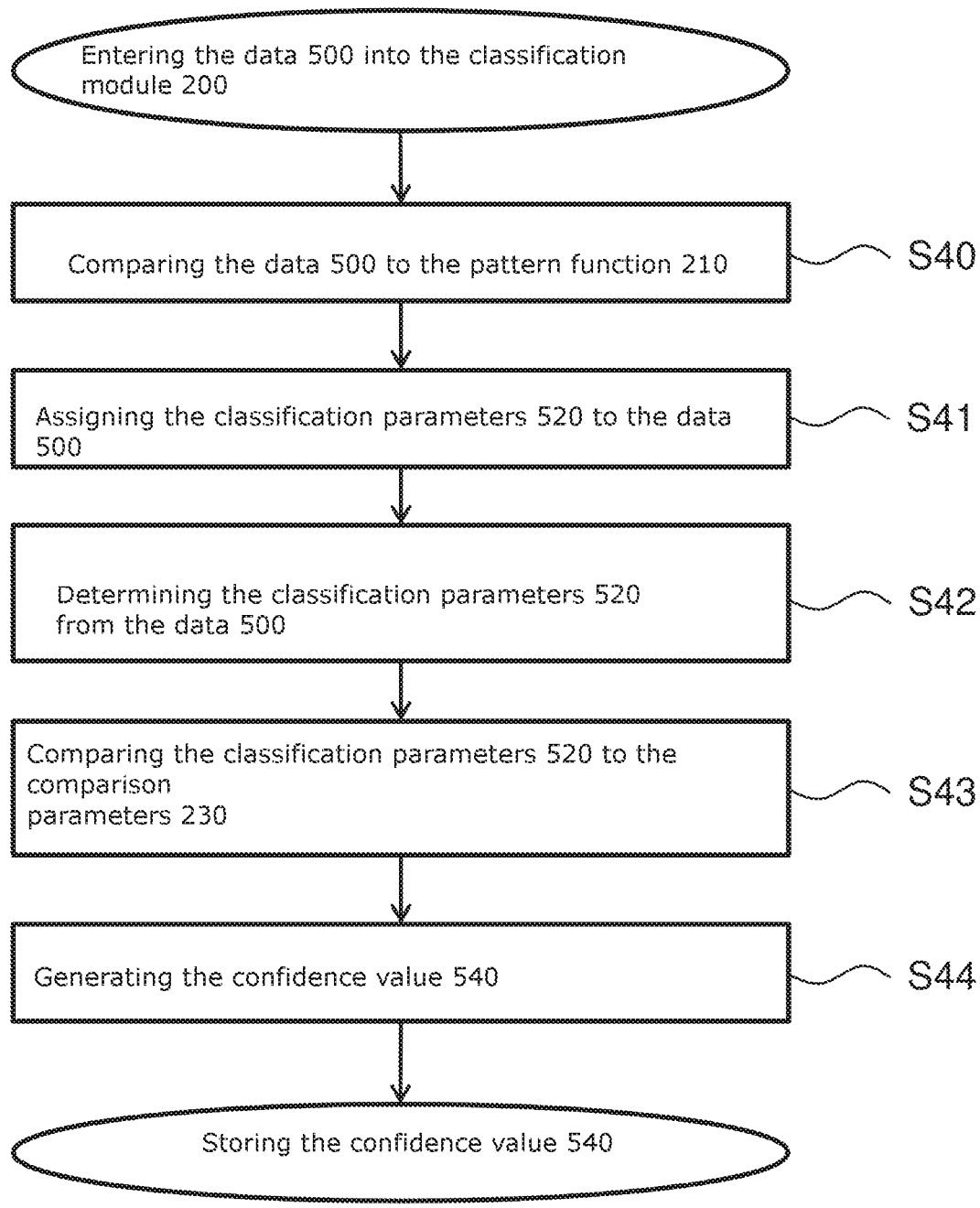
FIG. 4 shows a schematic method for handling data processed by the mobile, portable communication system.

FIG. 4 shows the schematic flow for generating the confidence value 540 from the data 500. Initially, a sensor or an application detects the data 500. The data 500 is then transmitted to the classification module 200. The classification module 200 retrieves a pattern function 210 from the memory and, in step S40, compares the pattern function 210 to the data 500. In step S41, the data 500 is assigned to a pattern function 210. In step S42, the classification parameters 520 assigned to the pattern function 210 are determined from the data 500 in response to the assignment of the pattern function 210.

A comparison data set 220 comprising data is stored in the memory 120 of the mobile, portable communication system 100, wherein the data of the comparison data set 220 has the structure of the data 500. Comparison parameters 230, which were calculated from the data of the comparison data set 220, are assigned to the comparison data set 220. The classification module 200 reads out the comparison parameters 230 from the memory 120 of the mobile, portable communication system and, in step S43, compares the comparison parameters 230 to the classification parameters 520. From the difference, the classification module 200, in step S44, generates at least one confidence value 540, wherein each confidence value 540 is assigned to a classification parameter 520, and the number of the classification parameters 520 is thus equal to the number of the confidence values 540.

According to one embodiment, the confidence values 540 are then combined to form a resulting confidence value, for example, by finding the mean value, the median, the mode or by a more complex calculation. The resulting confidence value is stored in the memory 120 of the mobile, portable communication system 100. In the event of an authentication request, the resulting confidence value is read out from the memory 120 of the mobile, portable communication system 100.

In another embodiment, the at least one confidence value 540 is stored in the memory 120 of the mobile, portable communication system 100 and may be read out in the event of an authentication request.

If the user has been authenticated according to the classification result 600, the data 500 which contributed to the successful authentication is added to the memory 120 of the mobile, portable communication system, so as to be used for future authentication attempts during the generation of the future confidence values 540.

Figure 5:
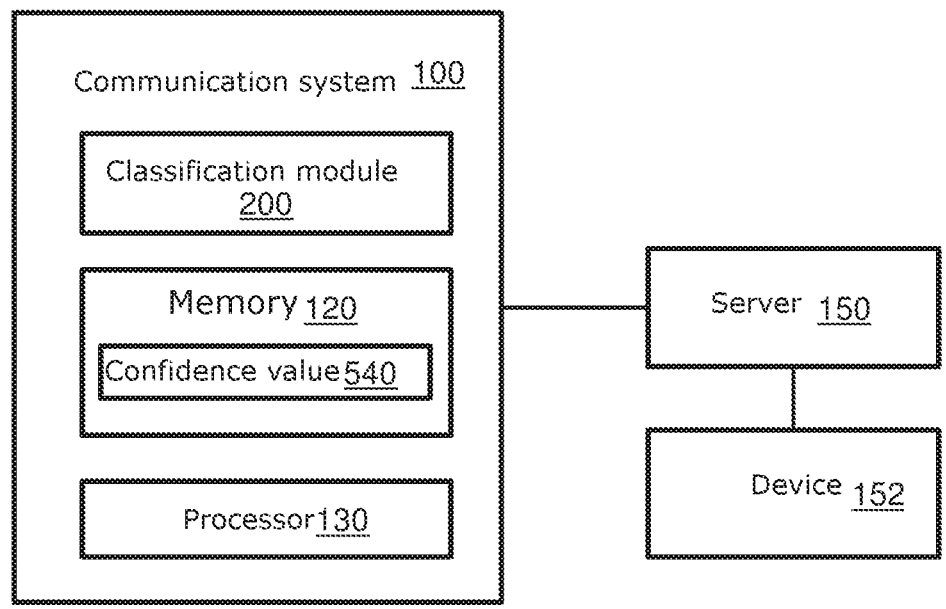
FIG. 5 shows a schematic design of an exemplary connection between a mobile, portable communication system, a server and a device.

FIG. 5 shows the schematic design of an exemplary embodiment. The communication system 100 is communicatively connected to the server 150, wherein the server is communicatively connected to the device 152.

According to embodiments, the communicative connection between the server and the mobile, portable communication system may be designed as a wireless link. The wireless link may, for example, comprise a link via Bluetooth, a wireless local network (WLAN), radio frequency identification (RFID) or near filed communication (NFC).

The mobile, portable communication system 100 reads out the confidence value 540 from the memory 120 and generates the classification result 600 from the confidence value 540 by means of the processor 130. The classification result 600 is transmitted to the server 150, which checks the classification result 600 against an examination criterion. If the examination criterion is met, the server 150 activates the device 152 by means of a control signal by way of a communicative connection.

According to embodiments, the communicative connection between the server 150 and the device 152 may be designed as a network, for example as the Internet or an Intranet. According to further embodiments, the server 150 may furthermore be installed as a component in the device 152 itself.

The control signal comprises at least one necessary command so as to properly activate the device 152, and ensure, initiate and/or terminate the operation thereof.

According to another embodiment, the server 150 transmits an authentication signal to the mobile, portable communication system 100, which signals the successful authentication and/or the successful activation of the device 152 to the user via a man-machine interaction interface, such as a screen or a luminous element. According to another embodiment, the server 150 or the device 152 itself indicate the successful authentication and the successful activation of the device 152. According to this embodiment, the authentication signal may moreover be transmitted to the mobile, portable communication system 100, whereupon a successful authentication and activation of the device 152 is additionally signaled to the user by way of the mobile, portable communication system 100.

Figure 6:
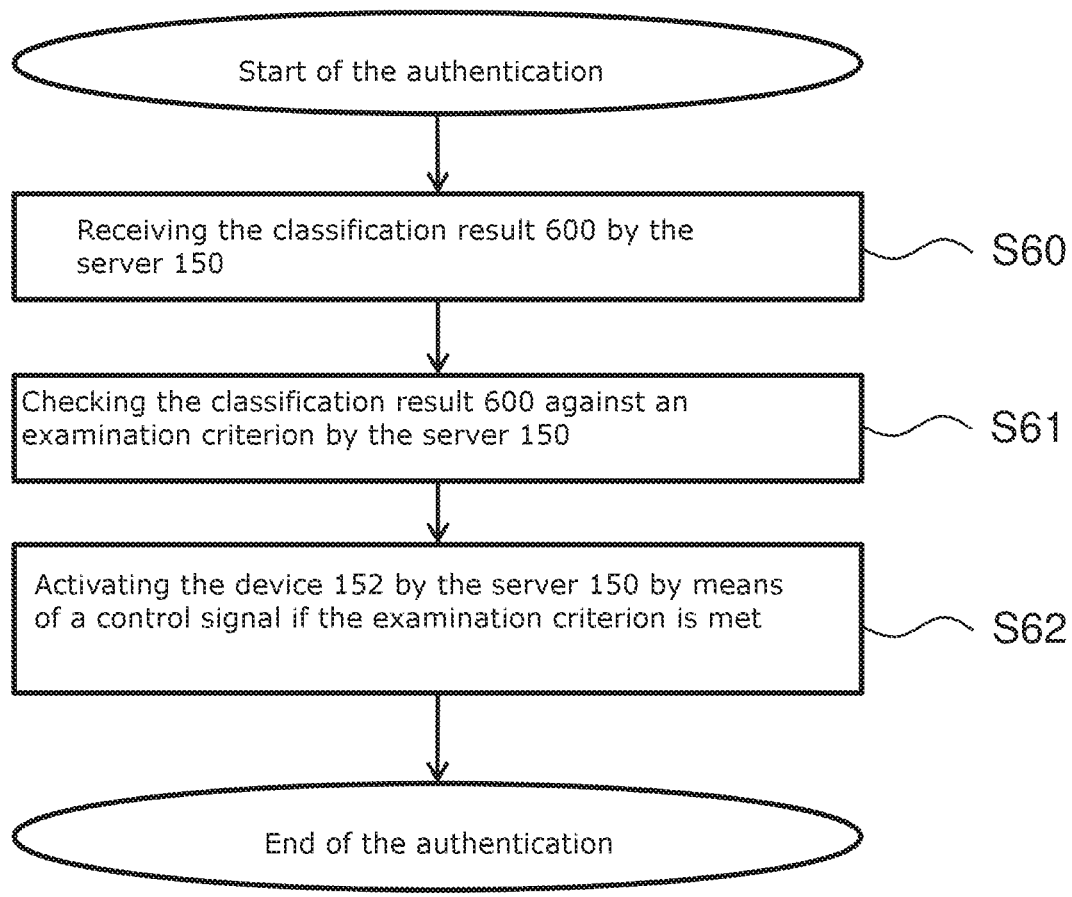
FIG. 6 shows steps of authenticating a user in a flow chart.

FIG. 6 shows the steps of the authentication in a flow chart. In step S60, the server 150 receives the classification result 600 from the mobile, portable communication system 100. According to embodiments, the transmission of the classification result 600 from the mobile, portable communication system 100 to the server 150 may take place in encrypted form and/or by means of a signature by the server. The encryption may, for example, comprise a symmetric encryption method, an asymmetric encryption method or a hybrid encryption.

In step S61, the server 150 checks the classification result 600 against an examination criterion. According to embodiments, the examination criterion may be determined by the device that the user is attempting to activate. A narrowness of the examination criterion denotes the degree of security required to successfully authenticate the user.

A narrow examination criterion may be used, for example, to authenticate the user with respect to sensitive devices. A sensitive device may be designed as a vehicle, an airplane or a front door, for example, without being limited thereto. Sensitive in this context shall be understood to mean than unauthorized access to the corresponding device may cause great damage to the user, the environment and/or the device itself.

In contrast, a less narrow examination criterion may be used to authenticate the user with respect to a less sensitive device. A less sensitive device may, for example, be a stereo system, a television or video player, or an illumination system.

If the examination criterion is met by the classification result 600, the user is considered to be authenticated. Thereupon, in step S62, the server 150 transmits a control signal to the device 152 so as to activate the device. If the device 152 and the server 150 are connected to one another via a network, according to embodiments the control signal may be transmitted in encrypted form. The control signal may be encrypted symmetrically or asymmetrically. According to further embodiments, the control signal may be signed or be transmitted in a signed and encrypted form by means of a hybrid method.

According to embodiments, the server 150 transmits an authentication signal to the mobile, portable communication system 100 in response to the successful authentication of the user. The mobile, portable communication system 100 may then signal the successful authentication to the user.

LIST OF REFERENCE NUMERALS

100: communication system
120: memory
130: processor
150: system
152: device

200: classification module
210: pattern function
220: comparison data set
230: comparison parameter
500: data
520: classification parameter
540: confidence values
600: classification result
S10: detecting the data
S21: entering the data into the classification module
S22: generating the confidence value
S23: storing the confidence value
S24: reading out the confidence value
S25: generating the classification result
S26: evaluating the classification result
S30: detecting the data
S31: entering the data into the classification module
S32: generating the confidence value
S33: storing the confidence value
S34: training the classification module
S341: checking whether the user is authenticated
S342: generating new comparison parameters
S343: adding the data to the comparison data set
S344: deleting the old data
S40: comparing the data
S41: assigning the classification parameters
S42: determining the classification parameters
S43: comparing the classification parameters
S44: generating the confidence value
S60: receiving the classification result
S61: checking the classification result
S62: activating the device

The invention claimed is:

1. A method for authenticating a current user of a mobile, portable communication system with respect to a server by means of a behavior-based authentication, the server comprising a first interface and a second interface, the first interface being configured to communicate with at least one activatable device, and the second interface being configured to communicate with a mobile, portable communication system, the method comprising:
receiving at least one classification result by the server from the mobile, portable communication system, the at least one classification result being based on a behavior of the current user;
evaluating the at least one classification result according to a predefined examination criterion by the server so as to authenticate the current user with respect to the server; and
activating the at least one activatable device by the server by means of a control signal,
wherein the behavior-based authentication is carried out by the mobile, portable communication system, which comprises at least one sensor for detecting gross motor measuring data, a gross motor skill classification module, a processor, and a memory,
wherein the sensor is designed to detect the gross motor measuring data of a gross motor movement of the current user of the mobile, portable communication system,
wherein the gross motor skill classification module is trained to recognize a generic gross motor movement pattern using training data sets of a user cohort, the gross motor skill classification module being executed by the processor of the mobile, portable communication system,
wherein the behavior-based authentication comprises the following steps:
a) repeatedly carrying out the following steps:
i. detecting the gross motor measuring data by the at least one sensor of the mobile, portable communication system, the gross motor measuring data being movement data of the gross motor movement of the current user,
ii. entering the gross motor measuring data into the gross motor skill classification module,
iii. generating at least one gross motor skill confidence value by the gross motor skill classification module, and
iv. storing the at least one gross motor skill confidence value in the memory of the mobile, portable communication system,
b) accessing the memory of the mobile, portable communication system so as to read out at least one of the stored gross motor skill confidence values from the memory of the mobile, portable communication system,
c) generating the at least one classification result, using the at least one gross motor skill confidence value, and
d) transmitting the at least one classification result to the server.

2. The method according to claim 1, wherein
the mobile, portable communication system comprises an application behavior classification module, the application behavior classification module being executed by the processor of the mobile, portable communication system;
the behavior-based authentication furthermore comprises:
a) repeatedly carrying out the following steps:
i. detecting application data;
ii. entering the application data in the application behavior classification module;
iii. generating at least one application behavior confidence value by the application behavior classification module; and
iv. storing the at least one application behavior confidence value in the memory of the mobile, portable communication system, and
b) accessing the memory of the mobile, portable communication system so as to read out at least one of the stored application behavior confidence values from the memory of the mobile, portable communication system, and
the at least one application behavior confidence value is used for generating the at least one classification result.

3. The method according to claim 2, wherein the application data comprises:
position data of the mobile, portable communication system; detected by a method for position determination by a sensor for determining a position of the mobile, portable communication system; and/or
application usage data of the current user, and/or
biometric data of the current user detected by a sensor for detecting biometric data; and/or
connection data of the mobile, portable communication system to other devices; and/or
calendar and/or time data of a clock implemented in the mobile, portable communication system, or of an external clock, a signal of which is received by a sensor of the mobile, portable communication system.

4. The method according to claim 1, wherein
the mobile, portable communication system comprises a fine motor skill classification module;
the fine motor skill classification module is configured to classify fine motor measuring data and trained to recognize a fine motor movement of a registered user, the fine motor skill classification module being executed by the processor of the mobile, portable communication system;
the behavior-based authentication furthermore comprises:
   a) repeatedly carrying out the following steps:
      i. detecting the fine motor measuring data;
      ii. entering the fine motor measuring data into the fine motor skill classification module;
      iii. generating at least one fine motor skill confidence value by the fine motor skill classification module; and
      iv. storing the at least one fine motor skill confidence value in the memory of the mobile, portable communication system; and
   b) accessing the memory of the mobile, portable communication system so as to read out at least one of the stored fine motor skill confidence values from the memory, and
the at least one fine motor skill confidence value also is used for generating the at least one classification result.

5. The method according to claim 1, wherein the behavior-based authentication furthermore comprises:
training the gross motor skill classification module using the gross motor measuring data of the current user, the gross motor skill classification module being trained for a user-specific gross motor movement pattern of the current user, provided that, according to the at least one classification result, the current user is a user registered in the mobile, portable communication system, and/or
training an application behavior classification module using application data of the current user, the application behavior classification module being trained for a user-specific application behavior pattern of the current user, provided that, according to the at least one classification result, the current user is the user registered in the mobile, portable communication system, and/or
training a fine motor skill classification module using fine motor measuring data of the current user, the fine motor skill classification module being trained for a user-specific fine motor behavior pattern of the current user, provided that, according to the at least one classification result, the current user is the user registered in the mobile, portable communication system.

6. The method according to claim 1, wherein
at least one gross motor skill pattern in a form of at least one gross motor skill pattern function and at least one gross motor skill comparison data set are stored in the memory of the mobile, portable communication system,
the gross motor skill comparison data set includes a plurality of gross motor measuring data, at least one first comparison parameter being calculated from the plurality of the gross motor measuring data of the gross motor skill comparison data set,
the gross motor skill classification module, in response to an input and detection of the gross motor measuring data, carries out the following steps:
   a) comparing the detected gross motor measuring data to the at least one gross motor skill pattern function;
   b) assigning the gross motor measuring data to the at least one gross motor skill pattern assigned to the at least one gross motor skill pattern function, and receiving at least one gross motor skill classification parameter corresponding to the at least one gross motor skill pattern if the gross motor measuring data may be assigned to the at least one gross motor skill pattern; and
   c) calculating a confidence value for each gross motor skill classification parameter by comparing the at least one gross motor skill classification parameter to a respective gross motor skill comparison parameter of the gross motor skill comparison data set, and
the step of training the gross motor skill classification module comprises adding the detected gross motor measuring data to the gross motor skill comparison data set.

7. The method according to claim 6, wherein
at least one application behavior pattern in a form of at least one application behavior pattern function and at least one application behavior comparison data set are stored in the memory of the mobile, portable communication system,
the application behavior comparison data set including a plurality of application data, at least one application behavior comparison parameter being calculated from the plurality of the application data of the application behavior comparison data set,
an application behavior classification module, in response to an input and detection of the application data, carries out the following steps:
   a) comparing the detected application data to the at least one application behavior pattern function;
   b) assigning the application data to the application behavior pattern assigned to the at least one application behavior pattern function, and receiving at least one application behavior classification parameter corresponding to the application behavior pattern if the application data may be assigned to the at least one application behavior pattern; and
   c) calculating a confidence value for each of the at least one application behavior classification parameter by comparing the at least one application behavior classification parameter to the respective application behavior comparison parameter of the application behavior comparison data set, and
the step of training the gross motor skill classification module comprises adding the detected application data to the application behavior comparison data set.

8. The method according to claim 7, wherein
at least one fine motor skill pattern in a form of a least one fine motor skill pattern function and at least one fine motor skill comparison data set are stored in the memory of the mobile, portable communication system, the fine motor skill comparison data set comprising values for at least one fine motor skill comparison parameter, a fine motor skill classification module, in response to an input and detection of fine motor measuring data, carrying out the following steps:
   a) comparing the detected fine motor measuring data to the at least one fine motor skill pattern function;
   b) assigning the fine motor measuring data to the fine motor skill pattern assigned to the fine motor skill pattern function, and receiving at least one fine motor classification parameter corresponding to the fine motor skill pattern if the fine motor measuring data may be assigned to the at least one fine motor skill pattern; and c) calculating a confidence value for each of the at least one fine motor skill classification parameter by comparing the at least one fine motor skill classification parameter to the respective fine motor skill comparison parameter of the fine motor skill comparison data set, and the step of training the gross motor skill classification module comprises adding the detected fine motor measuring data to the fine motor skill comparison data set.

9. The method according to claim 1, wherein the predefined examination criterion is met if:
the at least one classification result drops below a threshold value predefined by the predefined examination criterion, and/or
a maximum age of the at least one classification result predefined by the predefined examination criterion is not exceeded, and/or
a minimum number of classification results is present exceeding the threshold value.

10. The method according to claim 8, wherein the gross motor measuring data, which is part of the gross motor skill comparison data set and older than an established time, is removed from the gross motor skill comparison data set and deleted from the memory of the mobile, portable communication system, the application data, which is part of the application behavior comparison data set and older than the established time, is removed from the application behavior comparison data set and deleted from the memory of the mobile, portable communication system, and the fine motor measuring data, which is part of the fine motor skill comparison data set and older than the established time, is removed from the fine motor skill comparison data set and deleted from the memory of the mobile, portable communication system.

11. The method according to claim 1, wherein the current user of the mobile, portable communication system has to authenticate himself or herself with respect to the server after an initial operation of the mobile, portable communication system.

12. The method according to claim 8, wherein the mobile, portable communication system, after an initial operation of the mobile, portable communication system, transmits a signal to the current user, which includes a prompt to personalize the mobile, portable communication device by generating the at least one gross motor skill and/or application behavior and/or fine motor skill comparison data sets by the current user.

13. The method according to claim 3, wherein the at least one application behavior confidence value is only incorporated in the generation of the at least one classification result when, in one of the preceding steps, the gross motor skill classification module has recognized the gross motor movement of the current user in the gross motor measuring data.

14. The method according to claim 4, wherein the at least one fine motor skill confidence value is only incorporated in the evaluation of the at least one classification result when, in one of the preceding steps, the gross motor skill classification module has recognized the gross motor movement of the current user in the gross motor measuring data.

15. The method according to claim 1, wherein the at least one gross motor skill confidence value is processed by the processor of the mobile, portable communication system, a resulting confidence value indicating a probability with which an identity of the current user agrees with an identity of a user registered in the mobile, portable communication system.

16. The method according to claim 4, wherein individual confidence values of the gross motor skill, application behavior and/or fine motor skill classification parameters are each provided with a weighting factor of a plurality of weighting factors during the evaluation, the plurality of weighting factors being assigned to a respective confidence value.

17. The method according to claim 1, wherein a plurality of users is registered on the mobile, portable communication system, and a classification result is generated for each user, the mobile, portable communication system comprising a user recognition module, the user recognition module being configured to identify the current user as one of the registered users, the user recognition module being executed by the processor of the mobile, portable communication system.

18. The method according to claim 17, wherein
the user recognition module is configured to recognize a change in user based on a gross motor and/or fine motor movement,
the user recognition module being configured to classify the gross motor measuring data and/or fine motor measuring data and trained to recognize the gross motor and/or fine motor movement of the change in user of the mobile, portable communication system, the user recognition module being executed by the processor of the mobile, portable communication system, and
the behavior-based authentication furthermore comprises:
a) repeatedly carrying out the following steps:
entering the gross motor measuring data and/or fine motor measuring data into the user recognition module;
generating at least one change confidence value confidence value by the user recognition module; and
storing the at least one change confidence value confidence value in the memory of the mobile, portable communication system;
b) accessing the memory of the mobile, portable communication system so as to read out at least one of the stored change confidence value confidence values from the memory;
c) evaluating the at least one change confidence value confidence value so as to check whether a change in user has taken place; and
d) discarding existing confidence values if a change in user has taken place.

19. The method according to claim 1, wherein the server and the mobile, portable communication system communicate via a cryptographically secured wireless link.

20. The method according to claim 1, wherein the server and the at least one activatable device are communicatively connected to one another via a network.

21. The method according to claim 1, wherein the method furthermore comprises transmitting an authentication signal to the mobile, portable communication system by the server.

22. A system for authenticating a user of a mobile, portable communication system with respect to a server by means of a behavior-based authentication, wherein the system comprises:
the mobile, portable communication system; and
the server, the server being communicatively connected to at least one activatable device via a first interface and designed to communicate via a second interface with the mobile, portable communication system,
the server configured to authenticate the user of the mobile, portable communication system based on:

receiving at least one classification result by the server from the mobile, portable communication system, checking the at least one classification result by the server according to a predefined examination criterion, and activating the at least one activatable device by the server by means of a control signal, wherein the behavior-based authentication is carried out by the mobile, portable communication system, which comprises at least one sensor for detecting gross motor measuring data, a gross motor skill classification module, a processor, and a memory, wherein the sensor is designed to detect the gross motor measuring data of a gross motor movement of a current user of the mobile, portable communication system, wherein the gross motor skill classification module is trained to recognize a generic gross motor movement pattern using training data sets of a user cohort, the gross motor skill classification module being executed by the processor of the mobile, portable communication system, wherein the behavior-based authentication comprises the following, steps:

a) repeatedly carrying out the following steps:
   i. detecting the gross motor measuring data by the at least one sensor of the mobile, portable communication system, the gross motor measuring data being movement data of the gross motor movement of the current user,
   ii. entering the gross motor measuring data into the gross motor skill classification module,
   iii. generating at least one gross motor skill confidence value by the gross motor skill classification module, and
   iv. storing the at least one gross motor skill confidence value in the memory of the mobile, portable communication system, b) accessing the memory of mobile, portable communication system so as to read out at least one of the stored gross motor skill confidence values from the memory of the mobile, portable communication system, c) generating the at least one classification result, using the at least one gross motor skill confidence value, and d) transmitting the at least one classification result to the server.

23. The system according to claim 22, wherein the server and the mobile, portable communication device communicate via a cryptographically secured wireless link.

24. The system according to claim 22, further comprising: the at least one activatable device.

\* \* \* \* \*